(12) United States Patent
Li et al.

(10) Patent No.: US 10,649,121 B2
(45) Date of Patent: May 12, 2020

(54) LOW TS WIRE GRID POLARIZER

(71) Applicant: Moxtek, Inc., Orem, UT (US)

(72) Inventors: Hua Li, Sandy, UT (US); Bin Wang, Sandy, UT (US); Brian Bowers, Kaysville, UT (US)

(73) Assignee: Moxtek, Inc., Orem, UT (US)

( * ) Notice: Subject to any disclaimer, the term of this patent is extended or adjusted under 35 U.S.C. 154(b) by 181 days.

(21) Appl. No.: 16/054,147

(22) Filed: Aug. 3, 2018

(65) Prior Publication Data
US 2019/0107658 A1 Apr. 11, 2019

Related U.S. Application Data

(60) Provisional application No. 62/568,597, filed on Oct. 5, 2017.

(51) Int. Cl.
*G02B 5/30* (2006.01)
*G02B 27/28* (2006.01)

(52) U.S. Cl.
CPC ......... *G02B 5/3058* (2013.01); *G02B 27/283* (2013.01)

(58) Field of Classification Search
CPC .............................. G02B 5/3058; G02B 27/283
USPC ........................................ 359/485.05, 487.03
See application file for complete search history.

(56) References Cited

U.S. PATENT DOCUMENTS

| 7,268,946 | B2 * | 9/2007 | Wang ................... G02B 5/1809 359/484.1 |
| 7,570,424 | B2 * | 8/2009 | Perkins ................ G02B 5/3058 359/485.05 |
| 7,961,393 | B2 | 6/2011 | Perkins et al. |
| 10,139,536 | B2 * | 11/2018 | Wang ................... G02B 5/3075 |
| 10,139,538 | B2 * | 11/2018 | Wang ................... G02B 27/283 |
| 10,302,832 | B2 * | 5/2019 | Wang .................... G02B 5/045 |
| 2005/0277063 | A1 * | 12/2005 | Wang ................... G02B 5/1857 430/311 |
| 2006/0119937 | A1 | 6/2006 | Perkins et al. |
| 2007/0297052 | A1 | 12/2007 | Wang et al. |
| 2008/0316599 | A1 | 12/2008 | Wang et al. |
| 2012/0075830 | A1 | 3/2012 | Lee et al. |
| 2013/0100636 | A1 | 4/2013 | Suzuki |
| 2016/0047961 | A1 * | 2/2016 | Park ...................... G03F 7/0035 359/485.05 |
| 2018/0143364 | A1 | 5/2018 | Wang et al. |
| 2018/0143366 | A1 | 5/2018 | Wang et al. |

* cited by examiner

*Primary Examiner* — Ricky D Shafer
(74) *Attorney, Agent, or Firm* — Thorpe, North & Western, LLP

(57) ABSTRACT

A wire grid polarizer (WGP) can have low transmission of a primarily reflected/absorbed polarization (e.g. low Ts). The WGP can comprise an array of wires on a substrate and a stack of thin films between the substrate and the array of wires. The stack of thin films can include a first layer closest to the substrate, a second layer over the first layer, and a third layer over the second layer and closest to the array of wires. An index of refraction of the first layer can be greater than an index of refraction of the substrate, an index of refraction of the second layer can be greater than the index of refraction of the first layer, and an index of refraction of the third layer can be less than the index of refraction of the first layer.

20 Claims, 3 Drawing Sheets

LOW TS WIRE GRID POLARIZER

CLAIM OF PRIORITY

This application claims priority to U.S. Provisional Patent Application No. 62/568,597, filed on Oct. 5, 2017, which is incorporated herein by reference.

FIELD OF THE INVENTION

The present application is related generally to wire grid polarizers.

BACKGROUND

A wire grid polarizer (WGP) can primarily transmit one polarization (e.g. p-polarization) and primarily reflect or absorb an opposite polarization (e.g. s-polarization). High reflectivity of the opposite polarization (e.g. high Rs) can be important in some applications if both polarized light beams are used (e.g. s & p). High absorption/low reflectivity of the opposite polarization (e.g. low Rs) can be important in other applications if reflection of this polarization (Rs) will interfere with the optical system. For example, the reflected s-polarization can cause ghosting in an image projector. Some WGPs are designed for high reflection and others for high absorption of the s-polarization.

High transmission of one polarization (e.g. high Tp) can be an important feature of WGPs in order to minimize light-source power requirements. Low transmission of the opposite polarization (e.g. Ts) can be important for improved light image resolution. Some applications, including some image projection systems, require very low Ts, because any Ts above a negligible amount will distort the projected image.

SUMMARY

The present invention is directed to various embodiments of a wire grid polarizer (WGP) with low Ts (i.e. low transmission of the primarily reflected/absorbed polarization). The WGP can comprise an array of wires on a substrate and a stack of thin films between the substrate and the array of wires. The stack of thin films can include a first layer closest to the substrate, a second layer over the first layer, and a third layer over the second layer and closest to the array of wires.

In one embodiment, an index of refraction of the first layer can be greater than an index of refraction of the substrate, an index of refraction of the second layer can be greater than the index of refraction of the first layer, and an index of refraction of the third layer can be less than the index of refraction of the first layer.

In another embodiment, the WGP can further comprise a thin film in the channels and extending over a distal end of the array of wires farther from the substrate, defining a fourth layer, and a thin film over the fourth layer and farther from the substrate than the fourth layer, defining a fifth layer. The fourth layer can have an index of refraction less than the index of refraction of the first layer. The fifth layer can have an index of refraction greater than the index of refraction of the fourth layer.

In another embodiment, the first layer can include aluminum oxide; the second layer can include silicon nitride, hafnium oxide, or combinations thereof; the third layer can include silicon oxide; the fourth layer can include silicon oxide; and the fifth layer can include titanium oxide; or combinations thereof.

In another embodiment, for incident light, at an azimuth angle of 45° and at a polar angle with a value of 15°, incident on a first side of the WGP, the first side of the WGP being a side of the WGP on which the substrate is located, transmission of a minimally-transmitted polarization can be ≤0.0008 across a light wavelength range from 450 nm through 700 nm, where: the azimuth angle is an angle between a z-axis and a y-axis, the z-axis being perpendicular to the first face of the substrate, the y-axis being parallel to the first face of the substrate and perpendicular to a length of the wires; and the polar angle is an angle between an x-axis and a y-axis, the x-axis is parallel to the first face of the substrate and parallel to the length of the wires.

BRIEF DESCRIPTION OF THE DRAWINGS

Drawings Might not be Drawn to Scale

DEFINITIONS

As used herein, the term "aluminum oxide" includes $Al_2O_3$ and other combinations of aluminum and oxygen, including nonstoichiometric combinations; the term "hafnium oxide" includes $HfO_2$ and other combinations of hafnium and oxygen, including nonstoichiometric combinations; the term "silicon nitride" includes $Si_3N_4$ and other combinations of silicon and nitrogen, including nonstoichiometric combinations; the term "silicon oxide" includes $SiO_2$ and other combinations of silicon and oxygen, including nonstoichiometric combinations; and the term "titanium oxide" includes $TiO_2$ and other combinations of titanium and oxygen, including nonstoichiometric combinations.

As used herein, the term "elongated" means that a length L of the wires 14 (length extending into each sheet of FIGS.

Figure 2:
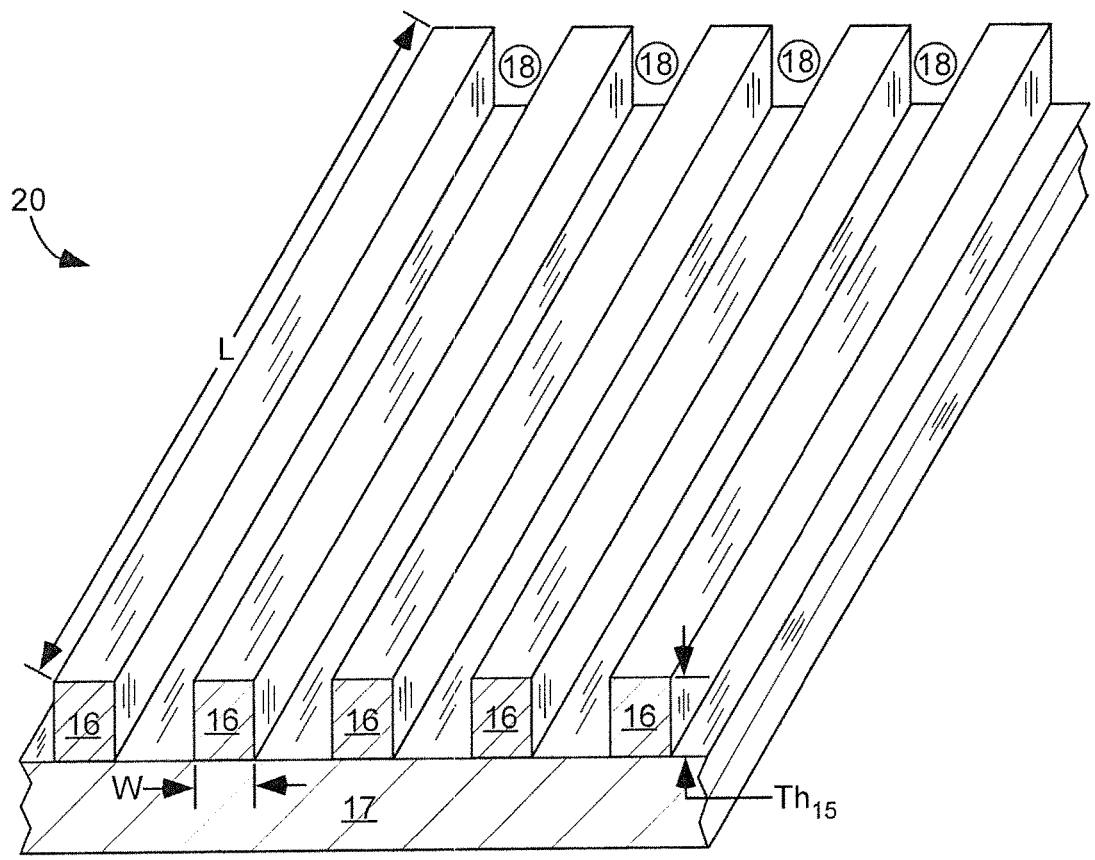
FIG. 2 is a schematic perspective-view of WGP 20, similar to WGP 10 of FIG. 1, but for clarity of display of other WGP components, WGP 20 does not show the stack of thin films 19, in accordance with an embodiment of the present invention.

1, 3-4, and shown in the schematic perspective-view of FIG. 2) is substantially greater than wire width W or wire thickness $Th_{15}$.

As used herein, the term "equal", with regard to equality of indices of refraction, means exactly equal, equal within normal manufacturing tolerances, or nearly equal, such that any deviation from exactly equal would have negligible effect for ordinary use of the device.

As used herein, the terms "fill the channels" and "filling the channels" mean that the channels are filled completely, filled as completely as allowed by normal manufacturing methods, or filled nearly complete such that any deviation from filled completely would have negligible, adverse effect for ordinary use of the polarizer.

As used herein, the term "nm" means nanometer(s).

As used herein, the terms "on", "located on", "located at", and "located over" mean located directly on or located over with some other material between. The terms "located directly on", "adjoin", "adjoins", and "adjoining" mean direct and immediate contact with no other solid material between.

As used herein, the term "parallel" means exactly parallel, parallel within normal manufacturing tolerances, or nearly parallel, such that any deviation from exactly parallel would have negligible effect for ordinary use of the device.

As used herein, the term "substrate" means a base material, such as for example a glass wafer. The substrate can be thick in an optical sense, meaning substantially thicker than a maximum wavelength of light in the wavelength range of use, if explicitly so stated in the claims. For example, a thickness $Th_{17}$ of the substrate can be $\geq 0.1$ mm, $\geq 0.35$ mm, or $\geq 0.6$ mm.

As used herein, the term "thin film" means a continuous layer that is not divided into a grid and having a thickness $\leq 10$ μm, $\leq 1$ μm, or $\leq 0.5$ μm, depending on the light spectrum of interest.

Each index of refraction value referred to herein means the real value (n) of such index of refraction across a wavelength range from 450-650 nm. Thus, for example, if a claim or the specification states that $n_{12} > n_{11}$, then this relationship is true across the wavelength range of 450-650 nm.

DETAILED DESCRIPTION

Figure 1:
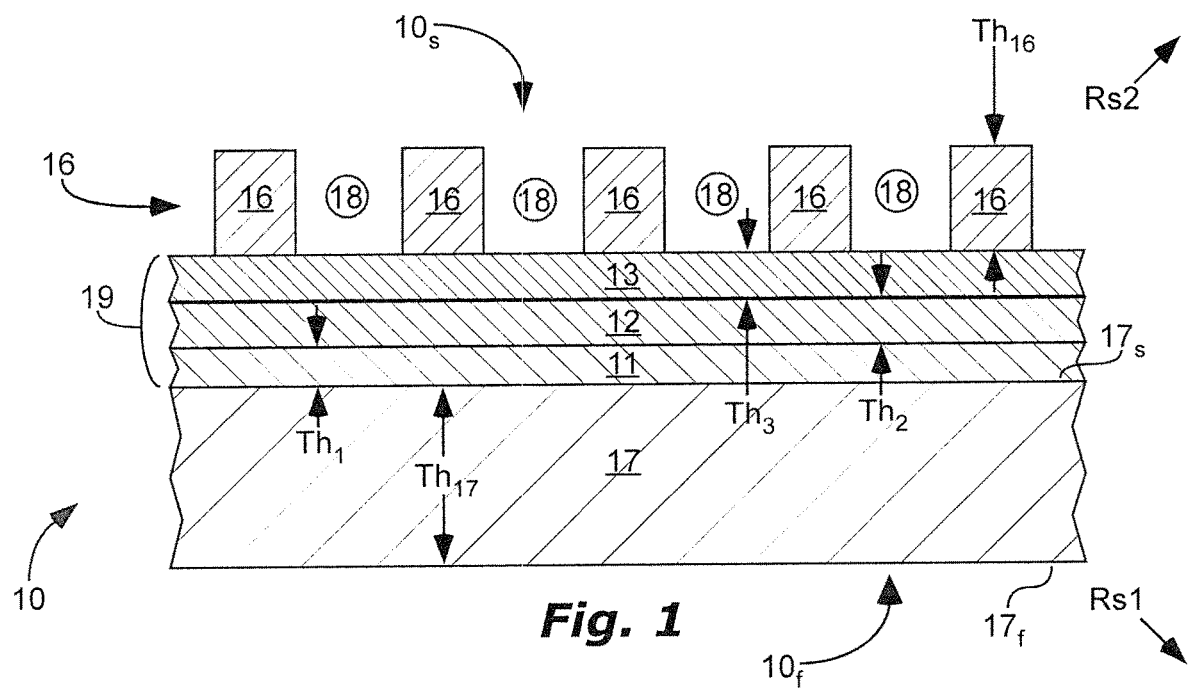
FIG. 1 is a schematic, cross-sectional side-view of a wire grid polarizer (WGP) 10, including an array of wires 16 on a substrate 17 and a stack of thin films 19 between the substrate 17 and the array of wires 16, the stack of thin films 19 including a first layer 11 closest to the substrate 17, a second layer 12 over the first layer 11, and a third layer 13 over the second layer 12 and closest to the array of wires 16, in accordance with an embodiment of the present invention.

As illustrated in FIG. 1, a wire grid polarizer (WGP) 10 is shown comprising a substrate 17 having a first face $17_f$ and a second face $17_s$ opposite of the first face $17_f$. The substrate 17 can be transparent. An array of wires 16 can be located on the second face $17_s$ of the substrate 17 with channels 18 between adjacent wires 16. The array of wires 16 can be elongated and parallel. There can be a stack of thin films 19 between the substrate 17 and the array of wires 16.

The stack of thin films 19 can include a first layer 11 closest to the substrate 17, a second layer 12 over the first layer 11, and a third layer 13 over the second layer 12 and closest to the array of wires 16. The terms "closest to the substrate" and "closest to the array of wires" mean closest of these three layers. Unless explicitly stated otherwise in the claim, there may be additional layer(s) between the first layer 11 and the substrate 17 and/or between the third layer 13 and the array of wires 16. The first layer 11 can adjoin the substrate 17, the second layer 12, or both. The third layer 13 can adjoin the second layer 12, the array of wires 16, or both.

Following are possible relationships of indices of refraction of the materials of the WGP, for optimizing performance of the WGP. An index of refraction $n_{11}$ of the first layer 11 can be greater than an index of refraction $n_{17}$ of the substrate 17 ($n_{11} > n_{17}$). An index of refraction $n_{12}$ of the second layer 12 can be greater than the index of refraction $n_{11}$ of the first layer 11 ($n_{12} > n_{11}$). An index of refraction $n_{13}$ of the third layer 13 can be less than the index of refraction $n_{11}$ of the first layer 11 ($n_{11} > n_{13}$), less than the index of refraction $n_{12}$ of the second layer 12 ($n_{12} > n_{13}$), or both. Examples of values of these indices of refraction include: $n_{17} \geq 1.3$ or $n_{17} \geq 1.4$; $n_{17} \geq 1.5$ or $n_{17} \leq 1.6$; $n_{11} \geq 1.6$, $n_{11} \geq 1.7$, or $n_{11} \geq 1.8$; $n_{11} \leq 1.8$, $n_{11} \leq 1.9$, or $n_{11} \geq 2.0$; $n_{12} \geq 1.8$, $n_{12} \geq 1.9$, $n_{12} \geq 2.1$, or $n_{12} \geq 2.4$; $n_{12} \leq 3$; $n_{13} \geq 1.3$ or $n_{13} \geq 1/4$; and $n_{13} \leq 1.5$ or $n_{13} \leq 1.6$. Other values of these indices of refraction are possible.

The first layer 11 can comprise aluminum oxide. For example, the first layer 11 can comprise $\geq 50\%$, $\geq 70\%$, $\geq 90\%$, or $\geq 95\%$ aluminum oxide. The second layer 12 can comprise silicon nitride. For example, the second layer 12 can comprise 50%, 70%, 90%, or 95% silicon nitride. The second layer 12 can comprise hafnium oxide. For example, the second layer 12 can comprise $\geq 50\%$, $\geq 70\%$, $\geq 90\%$, or $\geq 95\%$ hafnium oxide. The third layer 13 can comprise silicon oxide. For example, the third layer 13 can comprise $\geq 50\%$, $\geq 70\%$, $\geq 90\%$, or $\geq 95\%$ silicon oxide.

Figure 3:
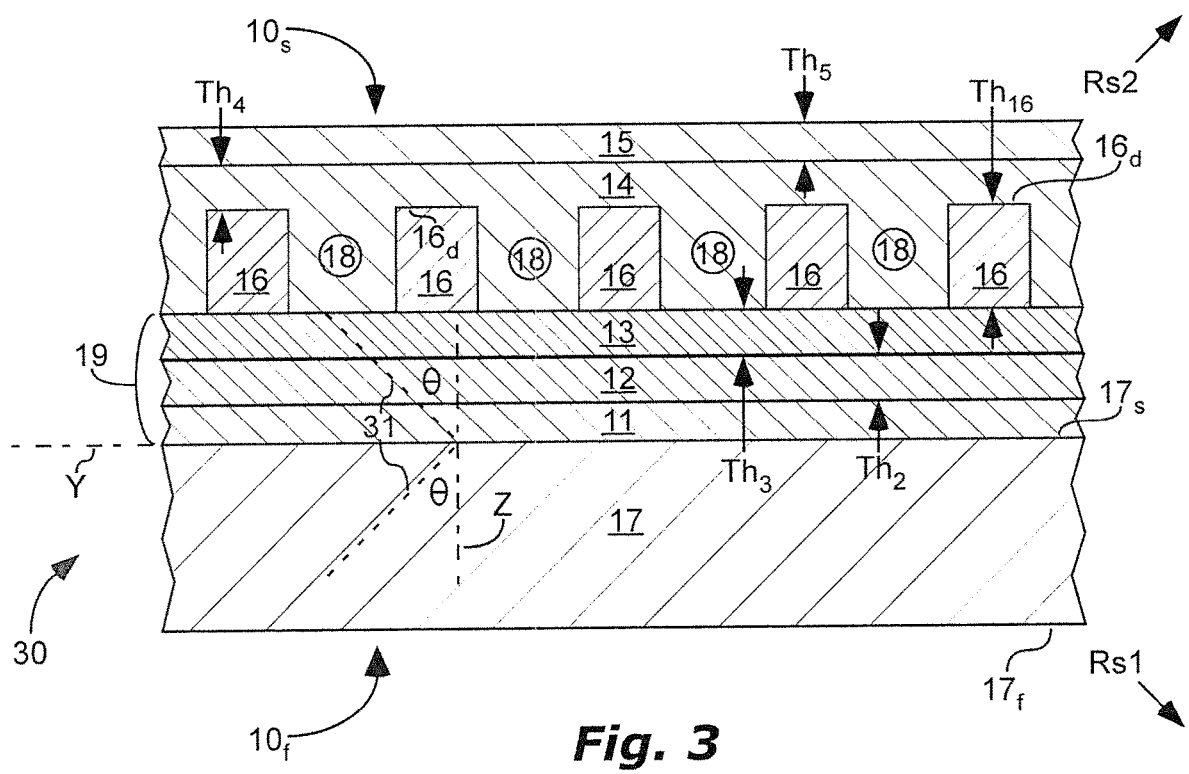
FIG. 3 is a schematic, cross-sectional side-view of WGP 30, similar to WGP 10 of FIG. 1, but further comprising a thin film filling channels 18 between adjacent wires 16 and extending over a distal end $16_d$ of the array of wires 16 farther from the substrate 17, defining a fourth layer 14, and a thin film over the fourth layer 14, defining a fifth layer 15, in accordance with an embodiment of the present invention.

WGP 30 in FIG. 3 can include all of the characteristics of WGP 10 described above, and can further comprise a thin film extending over a distal end $16_d$ of the array of wires 16 farther from the substrate 17, defining a fourth layer 14. The fourth layer 14 can fill the channels 18 or can partially fill the channels 18, such as for example $\geq 50\%$, $\geq 75\%$, or $\geq 90\%$ of the channels.

WGP 30 in FIG. 3 can further comprise a thin film over the fourth layer 14, located farther from the substrate 17 than the fourth layer 14, defining a fifth layer 15. The fifth layer 15 can have an index of refraction $n_{15}$ greater than an index of refraction $n_{14}$ of the fourth layer 14 ($n_{15} > n_{14}$). Examples of values of these indices of refraction include: $n_{14} \geq 1.3$ or $n_{14} \geq 1.4$; $n_{14} \leq 1.5$ or $n_{14} \leq 1.6$; $n_{15} \geq 1.8$, $n_{15} \geq 1.9$, $n_{15} \geq 2.1$, or $n_{15} \geq 2.4$; and $n_{15} \leq 4$. Other values of these indices of refraction are possible.

The fourth layer 14 can comprise silicon oxide. For example, the fourth layer 14 can comprise $\geq 50\%$, $\geq 70\%$, $\geq 90\%$, or $\geq 95\%$ silicon oxide. The fifth layer 15 can comprise titanium oxide. For example, the fifth layer 15 can comprise $\geq 50\%$, $\geq 70\%$, $\geq 90\%$, or $\geq 95\%$ titanium oxide.

Indices of refraction of the substrate 17, the third layer 13, and the fourth layer 14 can be equal ($n_{17} = n_{13} = n_{14}$) or nearly equal. For example, a difference between the index of refraction $n_{17}$ of the substrate 17 and the index of refraction $n_{13}$ of the third layer 13 can be $\leq 0.8$, $\leq 0.5$, $\leq 0.2$, or $\leq 0.1$. As another example, a difference between the index of refraction $n_{13}$ of the third layer 13 and the index of refraction $n_{14}$ of the fourth layer 14 can be $\leq 0.8$, $\leq 0.5$, $\leq 0.2$, or $\leq 0.1$.

Thicknesses of each thin film can be optimization for each individual WGP 10 or 30 design. Examples of thicknesses $Th_1$ of the first layer 11 include: $Th_1 = 120$ nm; $Th_1 \geq 30$ nm or $Th_1 \geq 80$ nm; and $Th_1 \leq 140$ nm or $Th_1 \leq 180$ nm. Examples of thicknesses $Th_2$ of the second layer 12 include: $Th_2 = 55$ nm; $Th_2 \geq 10$ nm or $Th_2 \geq 35$ nm; and $Th_2 \leq 80$ nm or $Th_2 \leq 110$ nm. Examples of thicknesses $Th_3$ of the third layer 13 include: $Th_3 = 45$ nm; $Th_3 \geq 10$ nm or $Th_3 \geq 30$ nm; and $Th_3 \leq 70$ nm or $Th_3 \leq 100$ nm. Examples of thicknesses $Th_4$ of the fourth layer 14 include: $Th_4 = 80$ nm; $Th_4 \geq 40$ nm or $Th_4 \geq 60$ nm; and $Th_4 \leq 110$ nm or $Th_4 \leq 150$ nm. Examples of thicknesses $Th_5$ of the fifth layer 15 include: $Th_5 = 50$ nm; $Th_5 \geq 10$ nm or $Th_5 \geq 30$ nm; and $Th_5 \leq 80$ nm or $Th_5 \leq 110$ nm.

The WGPs 10 and 30 described herein can be sandwiched between a pair of prisms to form a cube polarizing beam splitter. The WGPs 10 and 30 described herein can have high performance. WGP performance is dependent on light incident angle. These angles, azimuth angle θ and polar angle Φ, are shown in FIG. 3.

Figure 4:
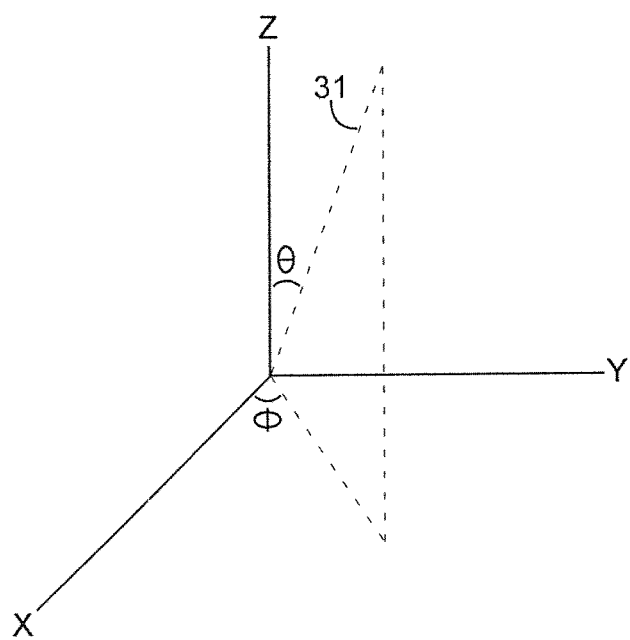
FIG. 4 is a schematic xyz coordinate plane showing azimuth angle θ and polar angle Φ, in accordance with an embodiment of the present invention.

As shown in FIGS. 3-4, an azimuth angle θ is an angle between a z-axis Z and a y-axis Y and a polar angle Φ is an angle between an x-axis X and the y-axis Y. The z-axis Z is perpendicular to the first face $17_f$ of the substrate 17. The y-axis Y and the x-axis X are both in a plane parallel to the first face $17_f$ of the substrate 17. The y-axis Y is perpendicular to the length L of the wires 16. The x-axis X is parallel to the length L of the wires 16. Thus, the x-axis extends into the page of FIG. 3.

Following are examples of performance of WGP 10 or 30 with incident light at various values of the azimuth angle θ and the polar angle Φ. For incident light at an azimuth angle θ of 45° and at a polar angle D of 15°, incident on a first side $10_f$ of the WGP 10 or 30, the first side $10_f$ of the WGP being a side of the WGP on which the transparent substrate 17 is located, transmission of a minimally-transmitted polarization (e.g. s-polarization) can be ≤0.0012, ≤0.001, ≤0.0008, ≤0.0005, ≤0.00025, ≤0.00015, or ≤0.00005, across a light wavelength range from 450 nm through 700 nm, or across a light wavelength range of 100 nm anywhere between 450 nm and 700 nm.

Another example, for incident light, at an azimuth angle θ of 45° and at a polar angle Φ of 0°, with respect to the first face $17_f$ of the substrate, incident on a first side $10_f$ of the WGP 10 or 30, contrast can be ≥10,000, ≥25,000, ≥40,000, ≥50,000, or ≥60,000 across a light wavelength range from 450 nm through 700 nm, or across a light wavelength range of 100 nm anywhere between 450 nm and 700 nm. Contrast is a percent transmission of a predominantly-transmitted polarization (e.g. Tp) divided by a percent transmission of a minimally-transmitted polarization (e.g. Ts); thus contrast can equal Tp/Ts.

As another example, for incident light, at an azimuth angle θ of 45° and at a polar angle Φ of 0°, with respect to the first face $17_f$ of the substrate 17, incident on the first side $10_f$ of the WGP 10 or 30, transmission of a minimally-transmitted polarization (e.g. Ts) can be ≤0.0001, ≤0.00005, ≤0.00002, ≤ or 0.000007, across a light wavelength range from 450 nm through 700 nm, or across a light wavelength range of 100 nm anywhere between 450 nm and 700 nm.

As another example, for incident light, at an azimuth angle θ of 45° and at a polar angle Φ of 0°, with respect to the first face $17_f$ of the substrate 17, Rs1 can be ≥0.83, ≥0.85, or ≥0.87 across the light wavelength range from 450 nm through 700 nm, or across a light wavelength range of 100 nm anywhere between 450 nm and 700 nm. Rs1 is a percent reflection of a predominantly reflected polarization of light (e.g. s-polarized light), incident on the first side $10_f$ of the WGP 10 or 30.

As another example, for incident light, at an azimuth angle θ of 45° and at a polar angle Φ of 0°, with respect to the second face $17_s$ of the substrate 17, Rs2 can be ≥0.90, ≥0.93, or ≥0.95 across the light wavelength range from 450 nm through 700 nm, or across a light wavelength range of 100 nm anywhere between 450 nm and 700 nm. Rs2 is a percent reflection of the predominantly reflected polarization of light (e.g. s-polarized light), incident on a second side $10_s$ of the WGP 10 or 30, the second side $10_s$ of the WGP 10 or 30 being opposite of the first side $10_f$ of the WGP 10 or 30 and being a side of the WGP 10 or 30 on which the array of wires 16 is located.

Figure 5:
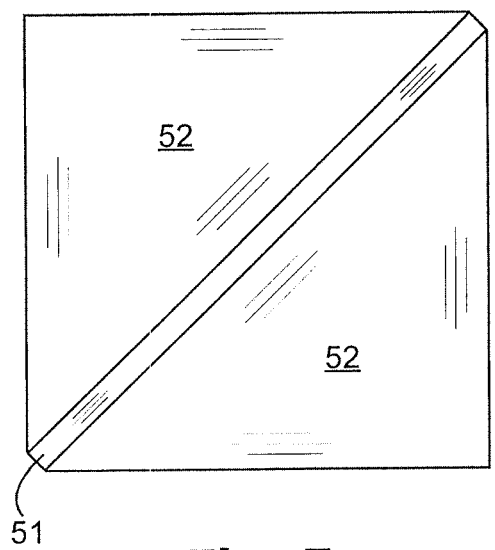
FIG. 5 is a schematic end-view of a cube polarizing beam splitter 50, including WGP 51, which can be WGP 10 or 30, sandwiched between two prisms 52, in accordance with an embodiment of the present invention.

As shown in FIG. 5, the WGPs 10 or 30 described above, shown as WGP 51, can be sandwiched between a pair of prisms 52, forming a cube polarizing beam splitter 50.

What is claimed is:

1. A wire grid polarizer (WGP) comprising:
    a substrate having a first face, and a second face opposite of the first face;
    an array of wires on the second face of the substrate with channels between adjacent wires;
    a stack of thin films between the substrate and the array of wires, the stack of thin films including a first layer closest to the substrate, a second layer over the first layer, and a third layer over the second layer and closest to the array of wires, the second layer being sandwiched between the first layer and the third layer;
    a thin film filling the channels and extending over a distal end of the array of wires farther from the substrate, defining a fourth layer;
    a thin film over the fourth layer and located farther from the substrate than the fourth layer, defining a fifth layer; and
    the first layer including aluminum oxide;
    the second layer including silicon nitride, hafnium oxide, or combinations thereof;
    the third layer including silicon oxide;
    the fourth layer including silicon oxide; and
    the fifth layer including titanium oxide.

2. The WGP of claim 1, wherein for incident light, at an azimuth angle with a value of 45° and a polar angle with a value of 15°, incident on a first side of the WGP, the first side of the WGP being a side of the WGP on which the substrate is located, transmission of a minimally-transmitted polarization is ≤0.0008 across a light wavelength range from 450 nm through 700 nm, where:
    the azimuth angle is an angle between a z-axis and a y-axis, the z-axis being perpendicular to the first face of the substrate, the y-axis being parallel to the first face of the substrate and perpendicular to a length of the wires; and
    the polar angle is an angle between an x-axis and a y-axis, the x-axis is parallel to the first face of the substrate and parallel to the length of the wires.

3. The WGP of claim 2, wherein the incident light, at the azimuth angle of 45° and at the polar angle with the value of 15°, transmission of the minimally-transmitted polarization is ≤0.00025 across the light wavelength range from 450 nm through 700 nm.

4. The WGP of claim 1, wherein:
    for incident light, at an azimuth angle of 45° and at a polar angle with a value of 0°, incident on the first side of the WGP, a percent reflection of a minimally-transmitted polarization is ≥0.85 across the light wavelength range from 450 nm through 700 nm;
    the incident light, at the azimuth angle of 45° and at the polar angle with a value of 0°, incident on a second side of the WGP, the second side of the WGP being opposite of the first side of the WGP and being a side of the WGP on which the array of wires is located, a percent reflection of the minimally-transmitted polarization is ≥0.93 across a light wavelength range from 450 nm through 700 nm.

5. The WGP of claim 1, wherein the first layer comprises ≥95% aluminum oxide, the second layer comprises ≥95% silicon nitride or ≥95% hafnium oxide, the third layer comprises ≥95% silicon oxide, the fourth layer comprises ≥95% silicon oxide, and the fifth layer comprises ≥95% titanium oxide.

6. A wire grid polarizer (WGP) comprising:
a substrate having a first face, and a second face opposite of the first face;
an array of wires on the second face of the substrate with channels between adjacent wires;
a stack of thin films between the substrate and the array of wires, the stack of thin films including a first layer closest to the substrate, a second layer over the first layer, and a third layer over the second layer and closest to the array of wires, the second layer being sandwiched between the first layer and the third layer;
an index of refraction of the first layer is greater than an index of refraction of the substrate, an index of refraction of the second layer is greater than the index of refraction of the first layer, and an index of refraction of the third layer is less than the index of refraction of the first layer; and
a thickness of the first layer is between 100 nm and 140 nm, a thickness of the second layer is between 35 nm and 75 nm, and a thickness of the third layer is between 25 nm and 65 nm.

7. The WGP of claim 6, wherein the second layer comprises silicon nitride.

8. The WGP of claim 6, wherein the first layer comprises 90% aluminum oxide, the second layer comprises >90% silicon nitride or 90% hafnium oxide, and the third layer comprises ≥90% silicon oxide.

9. The WGP of claim 6, further comprising:
a thin film filling ≥50% of the channels and extending over a distal end of the array of wires farther from the substrate, defining a fourth layer, the fourth layer having an index of refraction less than the index of refraction of the first layer; and
a thin film over the fourth layer, located farther from the substrate than the fourth layer, defining a fifth layer, the fifth layer having an index of refraction greater than the index of refraction of the fourth layer.

10. The WGP of claim 9, wherein the index of refraction of the fifth layer is greater than the index of refraction of the second layer.

11. The WGP of claim 9, wherein the fourth layer comprises silicon oxide and the fifth layer comprises titanium oxide.

12. The WGP of claim 6, wherein for incident light at an angle of 45° with respect to the first face of the substrate, incident on a first side of the WGP, the first side of the WGP being a side of the WGP on which the substrate is located, contrast is ≥40,000 across a light wavelength range from 450 nm through 700 nm, where the contrast is a percent transmission of a predominantly-transmitted polarization divided by a percent transmission of a minimally-transmitted polarization.

13. The WGP of claim 6, wherein for incident light at an angle of 45° with respect to the first face of the substrate, incident on a first side of the WGP, the first side of the WGP being a side of the WGP on which the substrate is located, transmission of a minimally-transmitted polarization is ≤0.00005 across a light wavelength range from 450 nm through 700 nm.

14. The WGP of claim 6, further comprising a pair of prisms, the WGP being sandwiched between the pair of prisms, forming a cube polarizing beam splitter.

15. A wire grid polarizer (WGP) comprising:
a substrate having a first face, and a second face opposite of the first face;
an array of wires on the second face of the substrate with channels between adjacent wires;
a stack of thin films between the substrate and the array of wires, the stack of thin films including a first layer closest to the substrate, a second layer over the first layer, and a third layer over the second layer and closest to the array of wires; and
the first layer comprises aluminum oxide, the second layer comprises silicon nitride, and the third layer comprises silicon oxide.

16. The WGP of claim 15, wherein for incident light, at an azimuth angle of 45° and at a polar angle with the value of 15°, transmission of a minimally-transmitted polarization is ≤0.00025 across a light wavelength range from 450 nm through 700 nm.

17. The WGP of claim 15, wherein:
for incident light, at an azimuth angle of 45° and at a polar angle with a value of 0°, incident on the first side of the WGP, a percent reflection of a minimally-transmitted polarization is ≥0.85 across a light wavelength range from 450 nm through 700 nm;
for incident light, at the azimuth angle of 45° and at the polar angle with a value of 0°, incident on a second side of the WGP, the second side of the WGP being opposite of the first side of the WGP and being a side of the WGP on which the array of wires is located, a percent reflection of the minimally-transmitted polarization is ≥0.93 across the light wavelength range from 450 nm through 700 nm.

18. The WGP of claim 15, wherein an index of refraction of the first layer is greater than an index of refraction of the substrate, an index of refraction of the second layer is greater than the index of refraction of the first layer, and an index of refraction of the third layer is less than the index of refraction of the first layer.

19. The WGP of claim 15, wherein a thickness of the first layer is between 100 nm and 140 nm, a thickness of the second layer is between 35 nm and 75 nm, and a thickness of the third layer is between 25 nm and 65 nm.

20. The WGP of claim 15, wherein for incident light, at an azimuth angle of 45° and at a polar angle with a value of 15°, incident on a first side of the WGP, the first side of the WGP being a side of the WGP on which the substrate is located, transmission of a minimally-transmitted polarization is ≤0.0008 across a light wavelength range from 450 nm through 700 nm, where:
the azimuth angle is an angle between a z-axis and a y-axis, the z-axis being perpendicular to the first face of the substrate, the y-axis being parallel to the first face of the substrate and perpendicular to a length of the wires; and
the polar angle is an angle between an x-axis and a y-axis, the x-axis is parallel to the first face of the substrate and parallel to the length of the wires.

* * * * *